United States Patent
Kern et al.

[11] 3,766,772
[45] Oct. 23, 1973

[54] APPARATUS FOR CONTROLLING METALLURGICAL PROCESSES

[75] Inventors: David W. Kern, Slatedale; Philip D. Stelts, Center Valley, both of Pa.

[73] Assignee: Bethlehem Steel Corporation, Bethlehem, Pa.

[22] Filed: Dec. 2, 1970

[21] Appl. No.: 94,271

Related U.S. Application Data

[62] Division of Ser. No. 661,616, Aug. 18, 1967, Pat. No. 3,574,598.

[52] U.S. Cl.................. 73/17 R, 73/354, 73/DIG. 9
[51] Int. Cl...................... G01n 25/06, G01k 13/12
[58] Field of Search...................... 73/354, 425.4 R, 73/17 R, 359, DIG. 9

[56] References Cited
UNITED STATES PATENTS

| | | | |
|---|---|---|---|
| 3,357,250 | 12/1967 | Lowdermilk | 73/354 |
| 3,321,973 | 5/1967 | Anderson | 73/359 |
| 3,463,005 | 8/1969 | Hance | 73/425.4 R |
| 3,455,164 | 7/1969 | Boyle | 73/354 |
| 3,481,201 | 12/1969 | Falk | 73/425.4 R |
| 3,298,069 | 1/1967 | Acre | 73/425.4 R |
| 3,246,520 | 4/1966 | Gaskill et al. | 73/359 |
| 3,501,957 | 3/1970 | Jones | 73/359 |
| 3,267,732 | 8/1966 | Hance | 73/359 |
| 3,080,755 | 3/1963 | Percy | 73/355 |
| 1,367,026 | 2/1921 | Drinker | 73/339 |

*Primary Examiner*—Herbert Goldstein
*Attorney*—John I. Iverson

[57] ABSTRACT

Apparatus capable of being immersed into a molten steel bath to obtain the temperature of the bath and the carbon content of a sample thereof. The apparatus is a hollow receptacle having a cavity capable of retaining and cooling a steel sample. The cavity contains a thermocouple which records the cooling characteristics of the steel sample and especially the liquidus arrest temperature corresponding to a phase transformation of the sample. The liquidus arrest temperature is used as a measure of the carbon content of the steel bath. A second thermocouple may be used to record the bath temperature directly. Also described are processes for controlling various steelmaking and refining processes, especially the basic oxygen steelmaking process.

1 Claim, 4 Drawing Figures

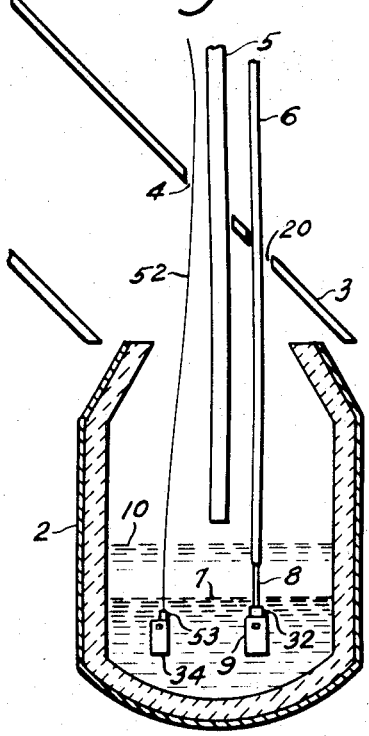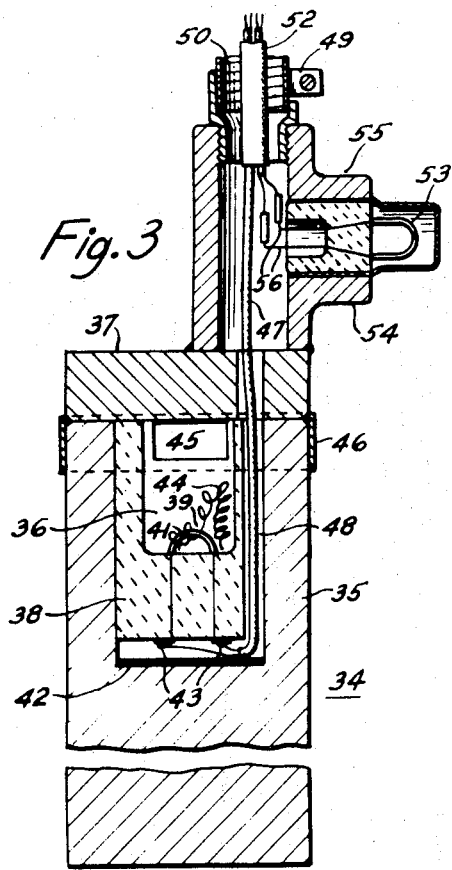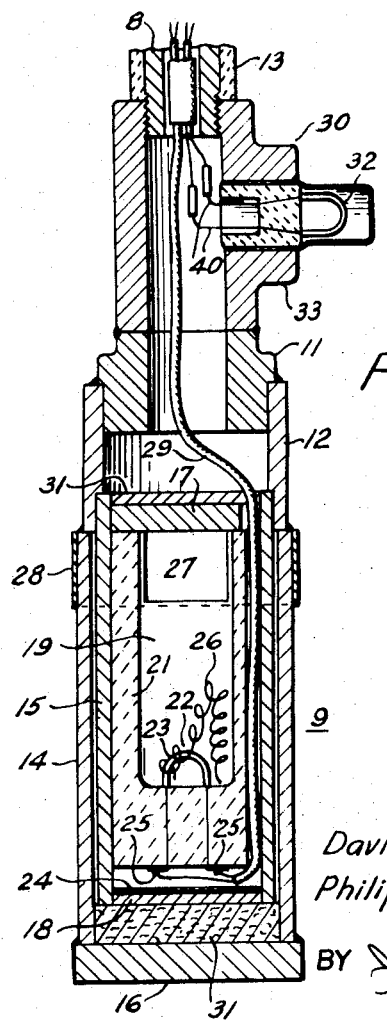
Fig. 1
Fig. 3
Fig. 2
INVENTORS
David W. Kern
Philip D. Stelts
BY John D. Theisen
AGENT

APPARATUS FOR CONTROLLING METALLURGICAL PROCESSES

CROSS-REFERENCES TO RELATED APPLICATIONS

This application is a division of U. S. Patent Application Ser. No. 661,616, filed Aug. 18, 1967, now U.S. Pat. No. 3,574,598 dated Apr. 13, 1971 by the present inventors, entitled "Method for Controlling Basic Oxygen Steelmaking".

BACKGROUND OF THE INVENTION

This invention relates to apparatus and processes for controlling the refining of molten steel. It is especially suitable for controlling the basic oxygen steelmaking process in which molten pig iron and scrap are refined into steel in a converter-like furnace by introducing substantially pure gaseous oxygen into the molten metal bath contained in the furnace from a lance positioned above the surface of the bath.

In refining molten pig iron and scrap into steel it is customary to stop the refining process whenever the molten steel bath has attained the desired temperature and carbon levels.

With some steelmaking processes, such as the well-known open-hearth and electric furnace processes, it is a relatively easy matter to take temperature measurements and a sample of the molten steel bath for carbon analysis during the course of the refining process in order to assist the furnace operator in determining just when the molten steel is ready to tap from the furnace. Since these steelmaking processes take at least several hours to complete, the time required to take the necessary temperature measurements or to take a sample of the molten steel and have it analyzed is of little consequence.

In the basic oxygen process, molten pig iron and scrap are refined into steel in less than 1 hour in a converter-like furnace. The shape and construction of the furnace and its exhaust system and the violent nature of the process make the taking of bath temperature measurements or a sample of the bath an extremely difficult task without first interrupting the process and tilting the furnace over on its side. This is usually done near the very end of a heat.

The usual practice for obtaining the carbon level and temperature of the bath in a basic oxygen furnace is as follows. First the flow of oxygen coming from the lance is stopped, the lance is withdrawn and the furnace tilted over on its side. Next a molten steel sample is obtained by reaching into the mouth of the furnace with a spoon. At the same time an expendable thermocouple is inserted into the bath to obtain a bath temperature measurement. The molten steel sample is allowed to solidify in a mold and is then sent to a laboratory for analysis. After the sample has been analyzed for carbon content, the results are sent back to the furnace operator.

All of the above steps must take place before the furnace operator is in a position to know whether to tap the furnace or resume blowing with the oxygen. At best these several steps take about 8 to 10 minutes to complete. In some cases these steps must be repeated several times during the course of the heat before the molten steel is finally ready to be tapped from the furnace. The time required for these measurements is lost production time and is very costly to the steelmaker since many basic oxygen furnaces now in use are able to produce almost several hundred tons of steel in less than one hour.

Apparatus and techniques have been developed by others to try to measure the carbon level and/or temperature of the bath by monitoring the exhaust gases leaving the bath or by measuring the radiant energy within the furnace or coming off the bath. Also apparatus has been developed for taking a molten metal sample using an elongated probe mounted on a carriage and capable of being lowered into and withdrawn from the molten metal bath. However, at the present time, none of these techniques or apparatus have shown the reliability, flexibility or speed required for modern steelmaking practices.

SUMMARY OF THE INVENTION

It is an object of this invention to provide apparatus for accurately and rapidly determining the carbon level and temperature of a molten steel bath.

It is a further object of this invention to provide apparatus and processes for accurately controlling the refining of molten pig iron and scrap into steel, especially in a basic oxygen furnace.

It has been discovered that the foregoing objects can be attained by apparatus in the form of a receptacle which can be immersed in a molten steel bath and which contains a cavity capable of obtaining and retaining a sample of the steel bath. The cavity contains a thermocouple which is electrically connected to a temperature recording device which records the temperature of the metal sample.

BRIEF DESCRIPTION OF THE DRAWINGS

FIG. 1 is a cross-sectional view of a basic oxygen steelmaking furnace showing two embodiments of the apparatus of this invention.

FIG. 2 is a cross-sectional view of one embodiment of the apparatus of this invention.

FIG. 3 is a cross-sectional view of another embodiment of the apparatus of this invention.

DESCRIPTION OF THE PREFERRED EMBODIMENTS

Figure 4:
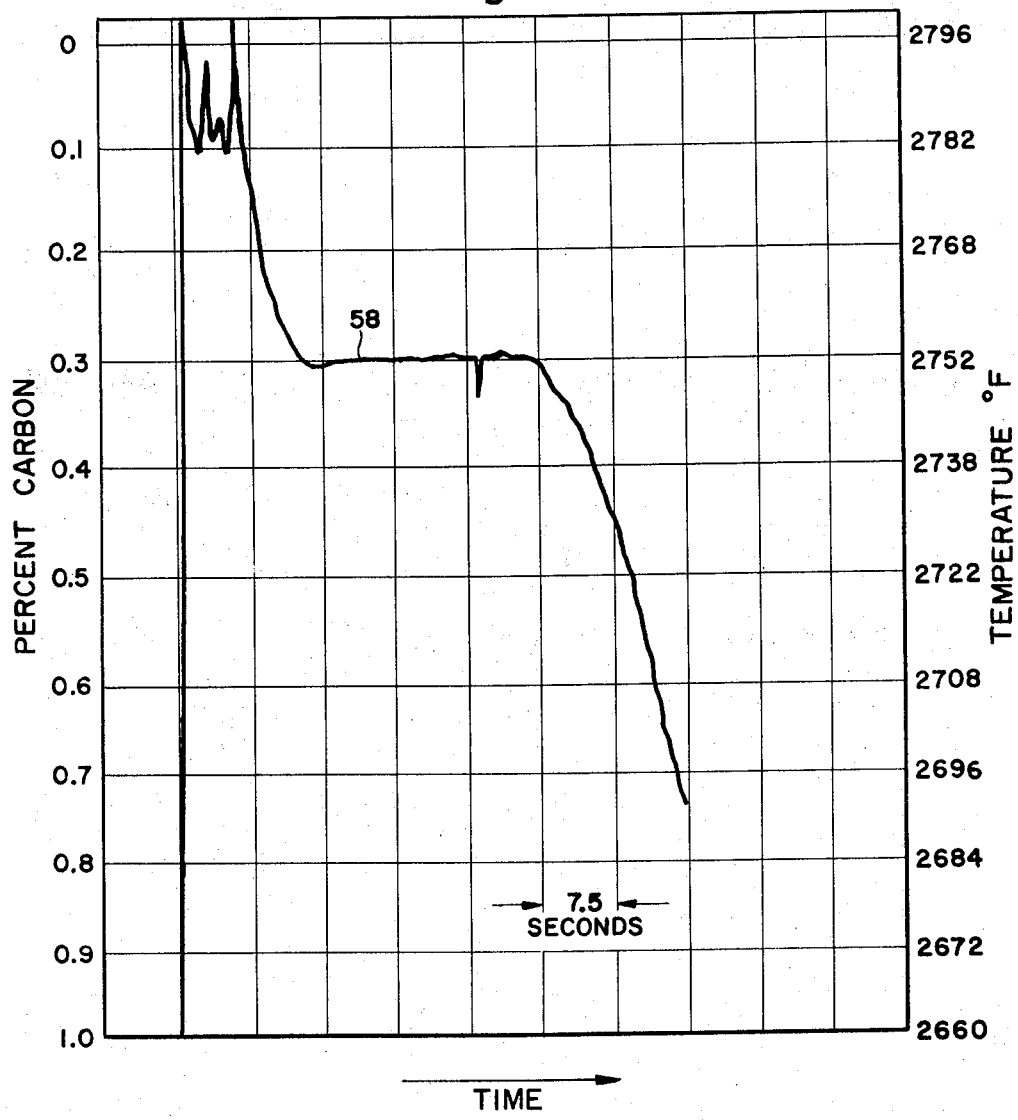
FIG. 4 is a typical cooling curve for a steel sample using the apparatus of this invention.

Referring to the FIGURES and in particular to FIG. 1, a basic oxygen steelmaking furnace 1 is shown which in general is comprised of a pear-shaped outer steel shell 2 lined with a suitable refractory. A water-cooled hood 3 surrounds the mouth of the furnace 1 and conveys the exhaust gases away from the furnace 1. An opening 4 is provided in the hood 3 to accommodate a water-cooled oxygen lance 5.

In accordance with one embodiment of the present invention, an auxiliary lance 6 passes through opening 20 in the hood 3 and is positioned alongside and parallel to the oxygen lance 5 as shown in FIG. 1. The auxiliary lance 6 is mounted on a motor driven carriage (not shown) capable of raising or lowering the auxiliary lance 6 in relation to the surface of the molten steel bath 7 contained in furnace 1.

The auxiliary lance 6 shown in FIGS. 1 and 2 comprises an elongated hollow shaft 8 with a receptacle 9 attached to the lower end of shaft 8 by a threaded bushing 11 and a coupling member 12. The exterior of shaft 8 is covered with a refractory covering or sleeve 13 to protect the hollow shaft 8 from the heat of furnace 1.

The receptacle 9, best shown in FIG. 2, comprises a cylindrical steel outer wall 14 and a cylindrical steel inner wall 15 connected to the coupling member 12 as shown in FIG. 2. A steel disc 16 welded to the outer steel wall 14 forms a bottom for receptacle 9. Steel discs 17 and 18 are attached to the top and bottom respectively of the inner steel wall 15 thereby forming a cavity 19 within the receptacle 9. The cavity 19 is preferably lined with a molded refractory sand cup 21 having a platinum/platinum 10 percent rhodium thermocouple 22 embedded in the base of the cup 21. The exposed portion of the thermocouple 22 is enclosed in a ceramic tube 23. A paper disc 24 electrically insulates the junctions 25 of the thermocouple 22 from the bottom disc 18 of cavity 19.

A small quantity of aluminum wire 26 is placed in the cavity 19 to act as a deoxidizer for the molten steel sample.

Two ports 27 are formed opposite each other extending through the outer wall 14 and the inner wall 15 above the bottom of cavity 19. The ports 27 permit a sample of molten steel to enter cavity 19 when the receptacle 9 is immersed in the molten steel bath 7 contained in furnace 1. The ports 27 are temporarily covered with a thin sheet metal sleeve 28 or the like to prevent the entry of slag as the receptacle 9 passes through the slag layer 10 covering the molten steel bath 7. The sleeve 28 quickly melts or burns away when the receptacle 9 is immersed in the steel bath 7 and permits a sample of the molten steel to enter cavity 19 through the ports 27.

Insulated wires 29 lead from the junctions 25 of thermocouple 22 between the inner steel wall 15 and the refractory lining 21 and up the hollow interior of steel shaft 8 to a temperature recording device (not shown). The wires 29 are preferably compensated to reduce any errors that could be caused by a heating of the wires 29 and the other circuitry.

Insulation 31 is used to fill any voids in receptacle 9 and to further insulate cavity 19 from the heat of furnace 1. While the outer steel wall 14 may be further protected from the heat of the furnace 1 by a refractory covering, care must be taken to insure that the exterior of receptacle 9 does not generate an excessive amount of gas which might interfere with the obtaining of a good sample when the receptacle 9 is immersed in molten steel. For this reason we prefer to leave the outer steel wall 14 uncovered.

Preferably a second platinum/platinum 10 percent rhodium thermocouple 32 is installed on the exterior of either receptacle 9 or shaft 8 to permit the thermocouple 32 to come into direct contact with the molten steel bath 7. We prefer to install thermocouple 32 in the stem 33 of a T-shaped connector 30 attached to shaft 8. Wires 40 extend from the rear of thermocouple 32 up the hollow shaft 8 to a second temperature recording device (not shown).

Another embodiment of this invention is shown in FIGS. 1 and 3. The receptacle 34 of this embodiment is designed to be freely dropped or thrown into a molten steel bath instead of being attached to the end of an auxiliary lance. The overall density of receptacle 34 is equal or greater than the density of molten steel, so that it will not float in the steel bath.

The receptacle shown in FIG. 3 is comprised of a heavy cylindrical forged steel billet section 35 having a cavity 36 formed therein. The top of the cavity 36 is closed with a heavy steel cover plate 37 welded to the billet section 35. The cavity 36 is preferably lined with a molded refractory sand cup 38 having a platinum/platinum 10 percent rhodium thermocouple 39 embedded in the base of the cup 38. The exposed portion of the thermocouple is enclosed in a ceramic tube 41. A paper disc 42 electrically insulates the junction 43 of the thermocouple 39 from the bottom of cavity 36.

A small quantity of aluminum wire 44 is placed in the cavity 36 to act as a deoxidizer for the molten steel sample.

Two ports 45 are formed opposite to each other extending through the walls of billet section 35 above the bottom of cavity 36. The ports 45 are temporarily closed by a sheet metal sleeve 46 to prevent the entry of slag into the cavity 36 as the receptacle 34 sinks through the slag layer 10 down into the molten steel bath 7. The sleeve 46 quickly melts when the receptacle 34 is immersed in the molten steel bath thereby permitting a sample of the molten steel bath to enter cavity 36 through the ports 45.

Insulated wires 47 lead from the junctions 43 of thermocouple 39 up between the walls of the billet section 35 and the refractory lining 38 through a double bore ceramic tube 48 which serves to further protect the wires 47 from the heat of furnace 1. The wires extend through a hole in cover plate 37 and into a clamp 49. The wires 47 emerge from clamp 49 and flexible conduit 50 as a rubber covered cord 52 which leads out of the furnace 1 to a temperature recording device (not shown). Preferably a second platinum/platinum 10 percent rhodium thermocouple 53 is installed on the exterior of receptacle 34 to permit the thermocouple 53 to come into direct contact with the molten steel bath 7. We prefer to install the thermocouple 53 in the stem 54 of a T-shaped connection 55 attached to cover plate 37. Wires 56 extend from the rear of thermocouple 53 through the clamp 49 and through cord 52 to a second temperature recording device (not shown).

The apparatus of this invention as shown in FIG. 2 is used in a basic oxygen furnace in the following manner. The receptacle 9 at the end of auxiliary lance 6 is immersed beneath the surface of the molten steel bath 7 by lowering auxiliary lance 6 after first temporarily shutting off the flow of oxygen from oxygen lance 5. With the embodiment shown in FIG. 3, the receptacle 34 is merely dropped into the bath 7 through the lance opening 4 or through an opening in hood 3 designed for this purpose. The receptacle 34 falls freely into the bath 7 with cord 52 trailing behind as shown in FIG. 1. With the embodiments shown in FIGS. 2 and 3, the flow of oxygen from oxygen lance 5 is shut off but the furnace 1 is not tilted from its upright position as shown in FIG. 1.

Immediately upon entering the bath, the sleeve 28 on receptacle 9 burns away and a small sample of molten steel from the bath is permitted to enter ports 27 and into cavity 19 around thermocouple 22 where it is deoxidized by the aluminum wire 26. The sample immediately begins to cool since it is protected from the molten steel bath by the thick walls of the receptacle 9.

At the same time, thermocouple 32 measures the bath temperature directly and transmits this information to a temperature recording device (not shown).

The temperature of the sample in cavity 19 is continuously measured by thermocouple 22 as it cools and is recorded by a temperature recording device (not shown). The temperature recording device may be a moving strip chart recorder, a computer, or both. A typical cooling curve for a sample using the apparatus of this invention as recorded on a moving strip chart recorder is shown by FIG. 4.

As the sample cools, it passes from the liquidus to solidus and in this region the temperature of the sample remains constant for a brief period of time. The point, corresponding to the beginning of the precipitation of the second phase in the sample, is commonly known as the "liquidus arrest temperature." The liquidus arrest temperature appears on the cooling curve as a brief horizontal break 58 in the cooling curve as illustrated in FIG. 4.

It has been known that there is a direct relation between the liquidus arrest temperature of molten steel and the carbon content of the steel. The approximate relationship can be readily determined from an iron-carbon phase diagram published in any textbook on steelmaking while the exact relationship can be determined experimentally. With the liquidus arrest temperature of 2,752° F. as indicated at point 58 on the curve for the example illustrated by FIG. 4, the carbon content of the sample would be 0.3 percent carbon.

It is not necessary to immediately remove the receptacle 9 from the molten steel bath 7, although it can be done if desird by merely raising the auxiliary lance 6. In using the embodiment shown in FIG. 3, it is obvious that the receptacle 34 and cord 52 will ultimately be destroyed by the heat of the furnace. However, this does not occur using the apparatus illustrated until the sample contained in its cavity has passed through the liquidus arrest temperature and this temperature has been recorded.

Thus, this invention provides a very useful tool for determining the carbon content and temperature of a molten steel bath in a very brief period of time without the necessity of interrupting the steel refining process for more than a few seconds.

The ability to obtain a bath carbon content measurement and a bath temperature measurement during the refining process permits improved methods of controlling various steel refining processes.

In the basic oxygen process for example, the carbon content of the bath and the bath temperature measurements can be fed to an electronic computer which calculates the amount of oxygen, time, coolant or other variables required to reach the desired tapping temperature and carbon level. Many basic oxygen furnaces are already equipped with computers and computer programs designed to make the required calculations. However, most basic oxygen furnace computer programs rely on charge calculations to predict the carbon content and temperature of the bath. The present invention, by permitting a carbon and temperature measurement to be obtained during the course of the heat greatly increases the accuracy of the computer program.

In addition this invention can be used with other control processes, such as those involving monitoring the exhaust gases, to provide the computer and/or operator with the information necessary to determine when the heat is ready to be tapped.

The measurements obtained using this invention may also be used to advantage in other steel refining processes such as the open hearth process and the electric furnace process. Likewise the invention is also useful for other steel refining processes, such as vacuum degassing, in order to control the carbon content and temperature of the molten steel being processed.

We claim:

1. Apparatus for determining the carbon content of a sample of molten ferrous metal during the course of a steel refining operation comprising a receptacle adapted to be immersed in a bath of molten ferrous metal contained in a vessel, said receptacle comprising a heat resistant steel outer shell having a hollow refractory lined sample retaining cavity formed therein, a piece of solid aluminum deoxidizer in said cavity and a platinum/platinum 10 percent rhodium thermocouple mounted in the base of said cavity, at least one molten metal inlet port connecting said cavity with the exterior of said receptacle and spaced vertically above said thermocouple, and means electrically connecting said thermocouple to means for indicating the liquidus arrest temperature of said sample.

* * * * *